US010778726B2

(12) United States Patent
Tsahhirov et al.

(10) Patent No.: US 10,778,726 B2
(45) Date of Patent: Sep. 15, 2020

(54) BIDIRECTIONAL DATA EXCHANGE BETWEEN COMPUTING DEVICES

(71) Applicant: Microsoft Technology Licensing, LLC, Redmond, WA (US)

(72) Inventors: Ilja Tsahhirov, Bellevue, WA (US); Tin Qian, Redmond, WA (US); Rajesh Gunnalan, Sammamish, WA (US); Mihhail Konovalov, Redmond, WA (US); Marcin Goliszewski, Redmond, WA (US); Aadu Adok, Tallinn (EE); Mykhailo Moroz, Tallinn (EE)

(73) Assignee: Microsoft Technology Licensing, LLC, Redmond, WA (US)

(*) Notice: Subject to any disclaimer, the term of this patent is extended or adjusted under 35 U.S.C. 154(b) by 112 days.

(21) Appl. No.: 15/692,940

(22) Filed: Aug. 31, 2017

(65) Prior Publication Data

US 2019/0068652 A1 Feb. 28, 2019

(51) Int. Cl.
*H04L 29/12* (2006.01)
*H04L 29/06* (2006.01)
(Continued)

(52) U.S. Cl.
CPC ........ *H04L 65/1003* (2013.01); *H04L 43/028* (2013.01); *H04L 61/2589* (2013.01);
(Continued)

(58) Field of Classification Search
None
See application file for complete search history.

(56) References Cited

U.S. PATENT DOCUMENTS 8,601,144 B1 * 12/2013 Ryner ................. G06F 21/45
709/228
2010/0325300 A1 12/2010 Vasters et al.
(Continued)

FOREIGN PATENT DOCUMENTS

WO 2005089063 A2 9/2005

OTHER PUBLICATIONS

"International Search Report and Written Opinion Issued in PCT Application No. PCT/US2018/036171", dated Sep. 13, 2018, 11 Pages.
(Continued)

*Primary Examiner* — Cai Y Chen
(74) *Attorney, Agent, or Firm* — Alleman Hall Creasman & Tuttle LLP

(57) ABSTRACT

A method for bidirectional data exchange includes, on a network computing device, receiving a first request from a first computing device via a request and response protocol, the first request including a first-device-provided portion of a data stream. The first-device-provided portion of the data stream is sent to a second computing device. A second-device-provided portion of the data stream is received from the second computing device. A second request is received from the first computing device via the request and response protocol, the second request soliciting the second-device-provided portion of the data stream. A response to the second request is sent to the first computing device via the request and response protocol, the response including the second-device-provided portion of the data stream.

20 Claims, 6 Drawing Sheets

(51) Int. Cl.
*H04L 12/26* (2006.01)
*H04L 29/08* (2006.01)

(52) U.S. Cl.
CPC ........ *H04L 65/105* (2013.01); *H04L 65/1069* (2013.01); *H04L 65/40* (2013.01); *H04L 65/608* (2013.01); *H04L 67/02* (2013.01); *H04L 69/164* (2013.01); *H04L 61/2514* (2013.01); *H04L 61/2575* (2013.01)

(56) References Cited

U.S. PATENT DOCUMENTS

| | | | |
|---|---|---|---|
| 2012/0124219 A1 | 5/2012 | Zhu et al. | |
| 2014/0310392 A1* | 10/2014 | Ho | H04L 69/16 709/223 |
| 2015/0188882 A1* | 7/2015 | Wang | H04L 61/2589 370/352 |
| 2016/0014210 A1 | 1/2016 | Thomas | |
| 2016/0380789 A1* | 12/2016 | Gunnalan | H04L 61/2589 709/228 |

OTHER PUBLICATIONS

"International Search Report and Written Opinion Issued in PCT Application No. PCT/US2018/037674", dated Sep. 18, 2018, 12 Pages.
"Interactive Connectivity Establishment (ICE) Extensions 2.0"; retrieved from <<https://msdn.microsoft.com/en-us/library/office/cc431504(v=office.12).aspx>>; 41 pages, released on Jun. 20, 2017.
"Traversal Using Relay NAT (TURN) Extensions"; retrieved from <<https://msdn.microsoft.com/en-us/library/office/cc431507(v=office.12).aspx>>; 59 pages, released on Aug. 1, 2017.
"Non Final Office Action Issued in U.S. Appl. No. 15/692,829", dated May 2, 2019, 12 Pages.

* cited by examiner

500

SEND A FIRST REQUEST TO A REMOTE COMPUTING DEVICE VIA A REQUEST AND RESPONSE PROTOCOL, THE FIRST REQUEST INCLUDING AN OUTGOING PORTION OF A DATA STREAM
502

SEND A SECOND, SEPARATE REQUEST TO THE REMOTE COMPUTING DEVICE VIA THE REQUEST AND RESPONSE PROTOCOL, THE SECOND REQUEST SOLICITING AN INCOMING PORTION OF THE DATA STREAM
504

RECEIVE, FROM THE REMOTE COMPUTING DEVICE AND VIA THE REQUEST AND RESPONSE PROTOCOL, A RESPONSE TO THE SECOND REQUEST, THE RESPONSE INCLUDING THE INCOMING PORTION OF THE DATA STREAM
506

FIG. 5

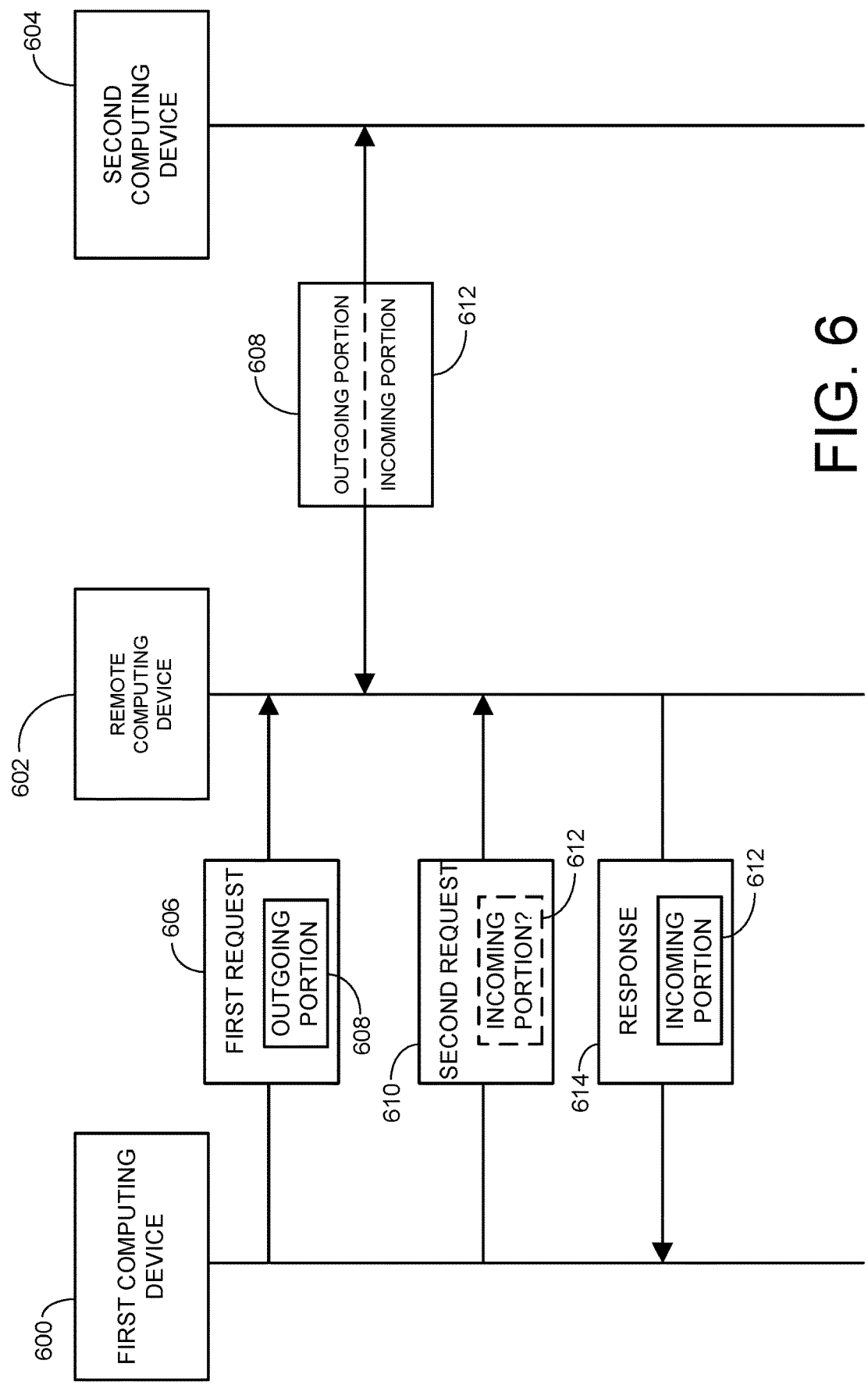

BIDIRECTIONAL DATA EXCHANGE BETWEEN COMPUTING DEVICES

BACKGROUND

A variety of computer networking applications involve establishing connections between two or more computing devices. Such networking applications can include multimedia streaming, Voice over IP (VoIP) communications, file sharing, online multiplayer video games, etc. The performance of these networking applications can be negatively impacted by various network security policies and devices, which often limit the ability of two computing devices to exchange data over a network.

BRIEF DESCRIPTION OF THE DRAWINGS

FIG. 5 illustrates an example method for bidirectional data exchange.

FIG. 6 schematically illustrates bidirectional exchange of data using a request and response protocol.

DETAILED DESCRIPTION

Figure 1:
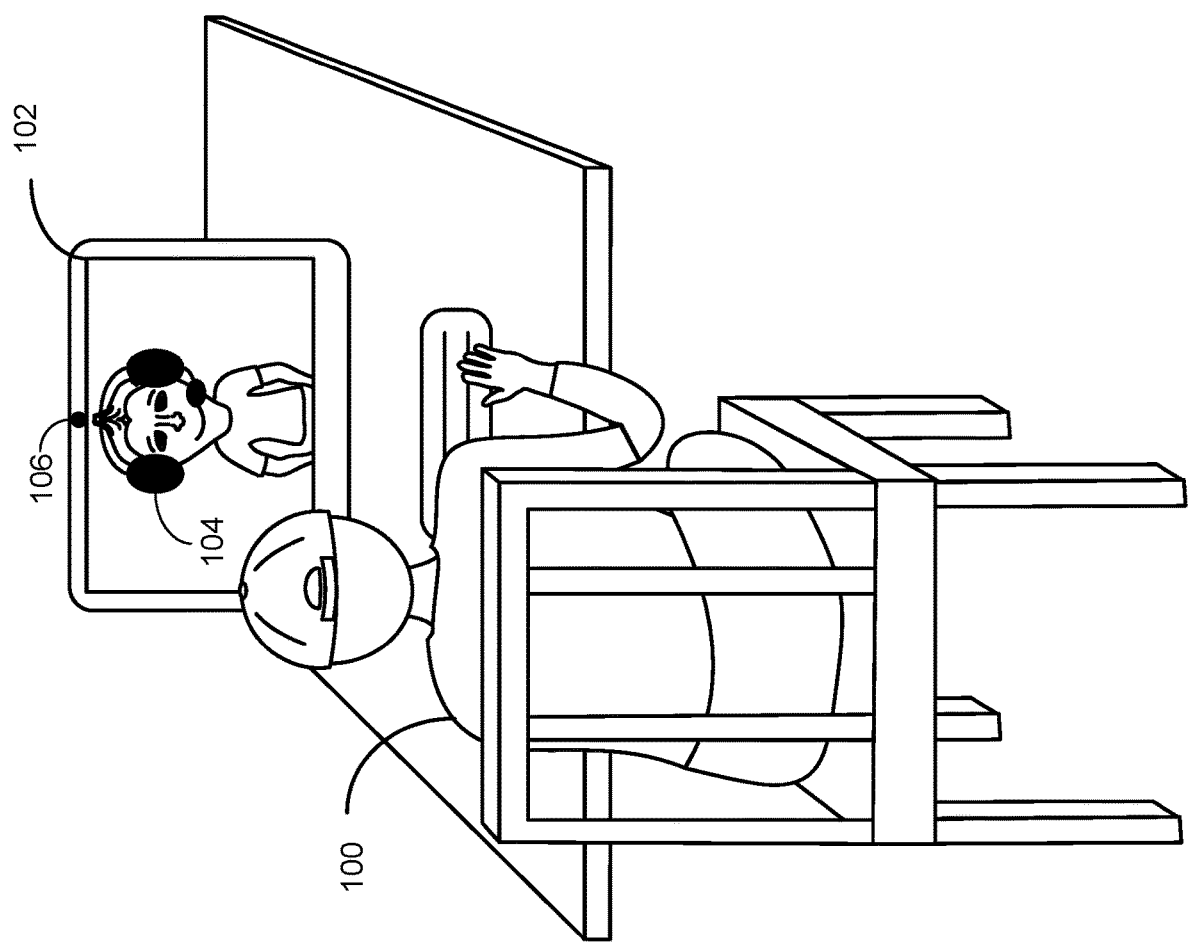
FIG. 1 illustrates an example computer-facilitated communication between two users.

A variety of different protocols and encoding techniques can be used to transmit data from one computer to another. Such protocols are often characterized via four conceptual layers that collectively form the Internet protocol suite, including the application layer, transport layer, Internet layer, and link layer. For example, when accessing a website, a computer may retrieve a Hypertext Markup Language (HTML) file from a remote server having a unique Internet Protocol (IP) address, which is a part of the Internet layer. The HTML document may be retrieved using the Hypertext Transfer Protocol (HTTP) of the application layer, with network packet transmission being managed by the Transmission Control Protocol (TCP) of the transport layer. In a multimedia streaming environment, a computer may connect to a server and retrieve multimedia content using the Real-Time Transport Protocol (RTP) of the application layer, with transmission of individual data packets (or datagrams) being handled by the User Datagram Protocol (UDP) of the transport layer. In general, different protocols and technologies may be differently-suited to different network applications and environments.

In an ideal scenario, a computing device would in most or all cases be able to send and receive data over a network using the best-suited network protocols. For example, TCP may be used in settings where transmission reliability and fidelity is preferred, at the expense of latency. Similarly, UDP may be used in settings where low latency is more important than reliable transmission. However, in some cases various network restrictions imposed by firewalls, security policies, Network Address Translation (NAT) devices, etc., may present a technical problem in that they limit the types of network traffic that a particular computing device can send and/or receive. Existing solutions to this technical problem, such as Interactive Connectivity Establishment (ICE), can help two computing devices identify a mutually viable communication path. However, such solutions can be ineffective in some network environments, such as when a network security policy only allows transmission of packets sent via a request and response protocol like HTTP. This can interfere with network applications that rely on bidirectional data flow, such as bidirectional media streaming, file sharing, VoIP and other types of computer-facilitated communication, online multiplayer gaming, etc. The functionality of such applications can therefore be significantly impaired, if not completely interrupted, unless network security is relaxed or special exceptions are added to the security policy. Both of these approaches have drawbacks, and may be impossible when a user attempting to establish a connection does not have control over their network configuration.

Accordingly, the present disclosure is directed to technical solutions to the problem of network security and/or infrastructure interfering with bidirectional data transmission. These solutions include techniques for bidirectional data exchange using a request and response protocol. As a technical result of the solutions described herein, multiple request and response data streams can be used to emulate a single, bidirectional data stream. This can enable two computing devices to establish a connection and exchange data as part of a bidirectional data stream, even when network policies only allow request and response traffic via, for example, HTTP. It will be understood that, while the bidirectional data exchange techniques described herein are especially beneficial in network environments that restrict some types of network traffic, the techniques described herein may be used in any network environment where a connection is established between two computing devices over a network, and need not be limited to any particular network environment, application, or protocol.

FIG. 1 illustrates an example computer-facilitated communication between two users. Specifically, FIG. 1 shows an example user 100 using a computing device 102 to communicate with a remote user 104 as part of a VoIP call. Such communication may include exchange of a data stream between computing device 102 and a remote computing device used by remote user 104. The data stream may include one or both of digitized audio and video from at least one call participant. As shown in FIG. 1, audio and video of user 100 is captured by a webcam 106 of computing device 102 and transmitted to the remote computing device of remote user 104. At the same time, audio and video captured by the remote computing device is sent to computing device 102 and presented to user 100. Accordingly, the data stream exchanged between computing device 102 and the remote computing device is bidirectional, such that audio/video of user 100 is being sent at the same time as audio/video of remote user 104 is being received.

Figure 2:
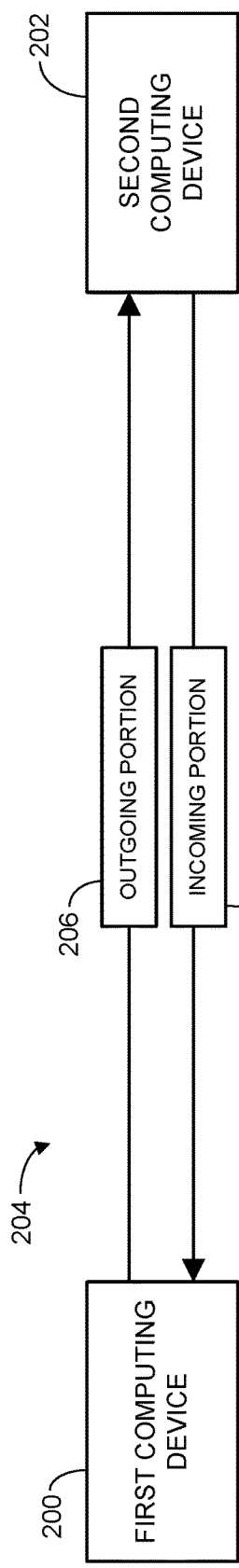
FIG. 2 schematically illustrates transmission of a data stream between two computing devices.

As indicated above, a variety of different protocols and connection types can be used to facilitate data transfer, though some network environments will be better suited to bidirectional data exchange than others. FIG. 2 schematically illustrates an example network environment in which a first computing device 200 and a second computing device 202 exchange a bidirectional data stream 204. Data stream 204 includes an outgoing portion 206 including data sent from the first computing device to the second computing device, as well as an incoming portion 208 including data sent from the second computing device to the first computing device. In the example of FIG. 1, outgoing portion 206 may include digitized audio/video of user 100, while incoming portion 208 includes digitized audio/video of remote user 104. In other examples, the outgoing and incoming portions of the data stream may include other types of data, depending on the specific purpose of the data exchange.

In the example of FIG. 2, a direct connection is established between the first and second computing devices. While the data stream may travel through any number of intermediate network routers, switches, cables, and/or other network infrastructure between the two computing devices, each data packet sent from the first computing device is addressed to the second computing device, and not an intermediate server. In other words, the network traffic is not relayed, filtered, inspected, etc., en route. Accordingly, the example of FIG. 2 illustrates an ideal connection between the two computing devices, in which the computing devices can use any suitable set of network protocols to communicate, and network performance will not be hindered by external influences.

Figure 3:
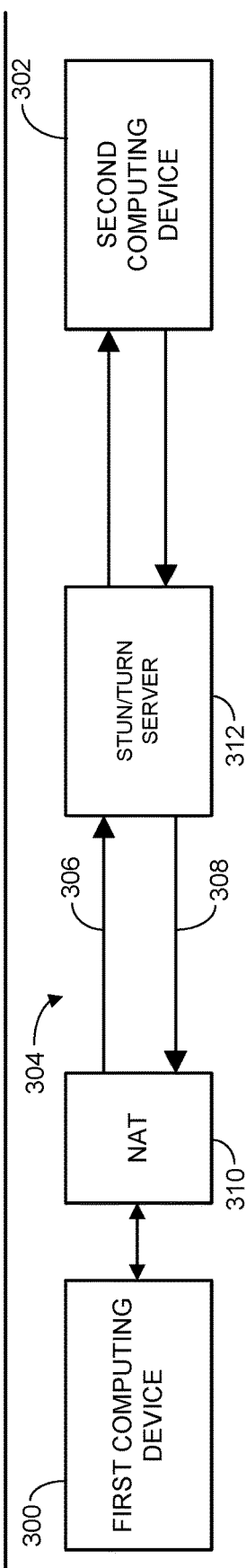
FIG. 3 schematically illustrates transmission of a data stream in a network environment utilizing Network Address Translation (NAT).

However, in real-world implementations, the specifics of a particular network environment can interfere with the ability of two computing devices to successfully establish a connection. FIG. 3 shows an example of such an environment, in which a first computing device 300 and a second computing device 302 exchange a bidirectional data stream 304, including an outgoing portion 306 and an incoming portion 308. In FIG. 3, the first and second computing devices are on opposite sides of a network device 310 that performs Network Address Translation (NAT). Use of NAT in this example allows for creation of a local network, in which each device on the local network has a unique local network address, though all devices on the local network share a single public network address (e.g., IP address) on a larger network (e.g., the Internet). While use of NAT is widespread and presents many advantages, it can interfere with direct communication between two computing devices on opposite sides of the NAT device, as the NAT device may be unable to determine which device on the local network the incoming network traffic is intended for. This problem can be exacerbated when both computing devices are each on separate local networks that use NAT, which is often the case.

Accordingly, use of VoIP applications in network environments featuring NAT, as well as other network applications that require bidirectional data exchange between two computing devices, can require the use of one or more NAT traversal techniques. Two common solutions for NAT traversal are Session Traversal Utilities for NAT (STUN) and Traversal Using Relays around NAT (TURN). Accordingly, in FIG. 3, the bidirectional data stream is shown passing through an intermediate server 312, which may be configured as a STUN or TURN server.

STUN generally involves a computing device behind NAT querying a STUN server for the network address (e.g., IP address) that the computing device presents to the public network. Once this network address is provided, the computing device can establish a connection with the second computing device, and specify the public network address to which the second computing device should send incoming data. Notably, once the STUN server provides the public network address, data can flow directly between the first and second computing devices, without requiring additional involvement of the STUN server.

TURN is generally used in situations where STUN alone is not sufficient. When TURN is used, the first computing device will connect to a TURN server and request that the server allocate a relay that can be used to exchange data with the second computing device. The two computing devices can then each connect to the TURN server, which has a well-known address on the public network (e.g., the Internet), and the TURN server will pass data sent by one computing device on to the other computing device. In this manner, each computing device can communicate with the other, without needing to know the network address of the other computing device.

Figure 4:
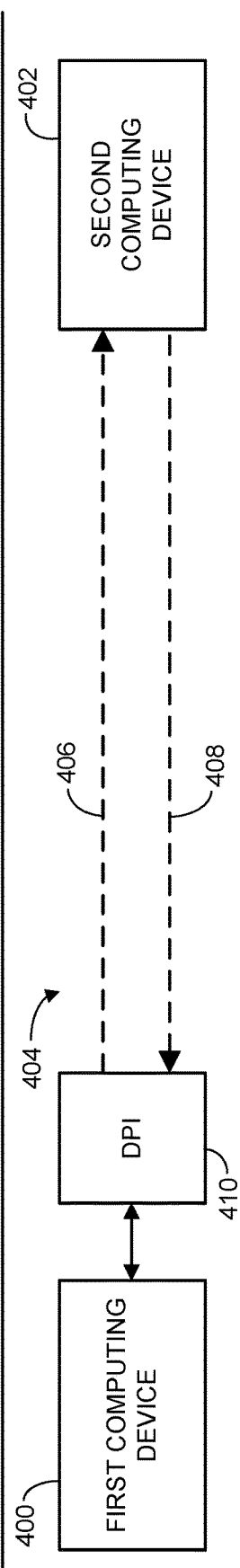
FIG. 4 schematically illustrates transmission of a data stream in a network environment utilizing Deep Packet Inspection (DPI).

FIG. 4 shows another example network environment that may interfere with the ability of two computing devices to establish a connection. Specifically, FIG. 4 shows a first computing device 400 and a second computing device 402 attempting to exchange data via a bidirectional data stream 404, which includes an outgoing portion 406 and an incoming portion 408. However, in FIG. 4, network traffic to and from first computing device 400 passes through a network device 410 that performs Deep Packet Inspection (DPI). DPI refers to a wide variety of network traffic inspection and/or filtering techniques that users, organizations, and/or Internet Service Providers (ISPs) can enable on their networks for a variety of reasons. DPI can include inspecting network traffic to identify viruses and other malicious data, inspecting data from specific users to identify improper network usage, blocking traffic to or from specific network addresses or websites, etc. DPI may be performed on a variety of network devices. For example, in some cases DPI may be performed at a proxy server that intercepts network traffic from all devices on a local network.

In some examples, DPI may be used to block network traffic that does not use specific network protocols. For example, because a large percentage of typical Internet traffic is sent as HTTP traffic over TCP, a DPI device may be configured to block traffic sent using different protocols, with the assumption that such traffic is not permitted by a network security policy. However, when a DPI device only allows traffic sent via a request and response protocol like HTTP, the ability of a computing device to send and receive a bidirectional data stream as described above can be compromised, in some cases rendering certain network applications completely unusable.

As an example, when traffic is sent using HTTP, a computing device is generally unable to send a request for data while receiving a response from a remote computing device, and vice versa. In a specific example, a computing device may send an HTTP request to a remote computing device, the request including some amount of data (e.g., digitized audio). After receiving the request, the remote computing device may respond with additional data (e.g., digitized audio from another party). Upon receiving the response, the computing device may send another request including additional data. Notably, after sending the first request, the computing device will be unable to send additional data until after it receives the response from the remote computing device. Similarly, after sending the response, the remote server will be unable to send more data until after it receives another request from the computing device. Accordingly, relying on a traditional request and response protocol for bidirectional communication may require each computing device to wait its "turn" before it can send data. This can make it impossible to conduct a VoIP call as shown in FIG. 1, as gaps are introduced between when a computing device identifies data for transmission, and when the data can actually be transmitted. These limitations can also affect other network applications that rely on bidirectional data exchange, as indicated above. In FIG. 4, the incoming and outgoing portions of bidirectional data stream 404 are shown in dashed lines, indicating that DPI device 410 is interrupting the data exchange.

Accordingly, FIG. 5 illustrates an example method 500 for bidirectional data exchange. Specifically, method 500 can be implemented on a computing device exchanging a bidirectional data stream with a remote computing device, such as a second computing device, intermediate server (e.g., TURN server), etc. In some cases, method 500 may be implemented on a computing system as described below with respect to FIG. 8. Further, method 500 may be implemented in any suitable network environment, and use any suitable request and response protocol. In other words, method 500 need not be restricted to network environments that use NAT, DPI, HTTP, etc.

At 502, method 500 includes sending a first request to a remote computing device via a request and response protocol, the first request including an outgoing portion of a data stream. This is schematically illustrated in FIG. 6, in which a first computing device 600 exchanges a data stream with a remote computing device 602. As indicated above, in some cases, data sent from the first computing device may be inspected by a proxy server or other network device performing DPI.

As used with regard to FIG. 6, a "data stream" will generally refer to the bidirectional exchange of data between the first and second computing devices, and is said to include both incoming and outgoing portions. However, it will be understood that each of the incoming and outgoing portions may be implemented as separate sets of data exchanged between the computing devices (i.e., separate "data streams") that collectively emulate a single, bidirectional data stream. Each of the incoming and outgoing portions may occasionally be referred to as "request and response streams" or "data streams."

In the specific example of FIG. 6, the data stream includes data transmitted between the first computing device and a second computing device 604, and the remote computing device is a server configured to facilitate bidirectional data exchange between the first and second computing devices. The remote computing device may be, for example, a TURN server, and/or other suitable computing device. In this example, the techniques for bidirectional exchange described herein may be confined to the first computing device and/or remote computing device, without requiring the second computing device to be specially configured to emulate a bidirectional data stream using individual request and response streams. However, it will be understood that, in some implementations, the remote computing device may be the second computing device, with no intermediate server between the two computing devices.

When the remote computing device is a TURN server, sending of the first request by the computing device may be preceded by one or more allocate requests intended to establish a relay candidate with the TURN server. In TURN, a relay candidate typically refers to a session maintained by the TURN server that relays data received from one computing device to another computing device over a network. For example, the computing device may send a first allocate request, and receive an allocate error response. Based on data included in the allocate error response, the computing device may send two concurrent allocate requests, one for incoming data and one for outgoing data. In some cases, each of these two concurrent allocate requests may specify a same session ID (provided, for example, in the allocate error response), thereby indicating to the TURN server that the two allocate requests are related. Upon receiving the two allocate requests, the TURN server may create a single relay candidate for the incoming and outgoing request and response streams. In some cases, the allocate requests sent by the computing device may be included within request and response packets. As an example, an allocate request may be included within the body of an otherwise normal HTTP packet. Upon successfully establishing a relay candidate with the TURN server, the computing device may send the first request including the outgoing portion of the data stream, as will be described in more detail below.

In FIG. 6, first computing device 600 sends a first request 606 to remote computing device 602 via a request and response protocol, the first request including an outgoing portion 608 of a data stream. Notably, this may occur once a viable communication path between the computing device and the remote computing device has been established. For example, one or both of the computing devices may use a technique such as ICE to determine that communication via the request and response protocol is possible. In some examples, the first request may be sent over TCP, and the request and response protocol may be HTTP, though any suitable network protocols may be used. When the request and response protocol is HTTP, the first request may be sent as an HTTP POST request. Further, the data stream may include any suitable data. As indicated above, in some examples, the data stream may be a VoIP communication between the first and second computing devices including digitized audio and/or video from at least one call participant. Accordingly, the outgoing portion may include digitized audio and/or video of a user of first computing device 600, such as user 100 of FIG. 1. However, in other cases, the data stream may be sent as part of a file sharing application, multiplayer online gaming application, and/or other suitable network application.

Returning briefly to FIG. 5, at 504, method 500 includes sending a second, separate request to the remote computing device via the request and response protocol, the second request soliciting an incoming portion of the data stream. This is schematically illustrated in FIG. 6, in which first computing device 600 sends a second request 610 to the remote computing device, the second request soliciting an incoming portion 612 of the data stream. Within second request 610, incoming portion 612 is shown with dashed lines, indicating that the second request does not actually include the incoming portion, but rather is requesting the incoming portion of the data stream from the remote computing device. As with the first request, the second request may be sent using any suitable network protocols. When the request and response protocol is HTTP, the second request may be sent as an HTTP GET request. The second request may, for example, include some reference to the first request (e.g., a TURN session ID), some indication as to how large the incoming portion will be, and/or any other information that may enable the remote computing device to effectively respond to the second request.

Returning briefly to FIG. 5, at 506, method 500 includes receiving, from the remote computing device and via the request and response protocol, a response to the second request, the response including the incoming portion of the data stream. This is also schematically illustrated in FIG. 6, in which remote computing device 602 sends a response 614 to the first computing device, the response including incoming portion 612. Within response 614, incoming portion 612 is shown with a solid line, indicating that the incoming portion is included within the response.

In some cases, the first and second requests may be sent by the computing device to the remote computing device at substantially the same time. Once both requests are sent, the remote computing device can send the response to the second request at the same time as the computing device is sending a new request, the new request including a new outgoing portion of the data stream. In this manner, the computing device can send outgoing data at the same time as it receives incoming data, thus emulating a single, bidirectional data stream with two different request and response streams. In some cases, the first and second requests may not be "fulfilled" until after data transmission between the computing device and remote computing device has ceased. In other words, the amount of data transmitted as part of the first request and solicited by the second request can be arbitrarily large, and sent as a plurality of individual data packets over a period of time.

Figure 7:
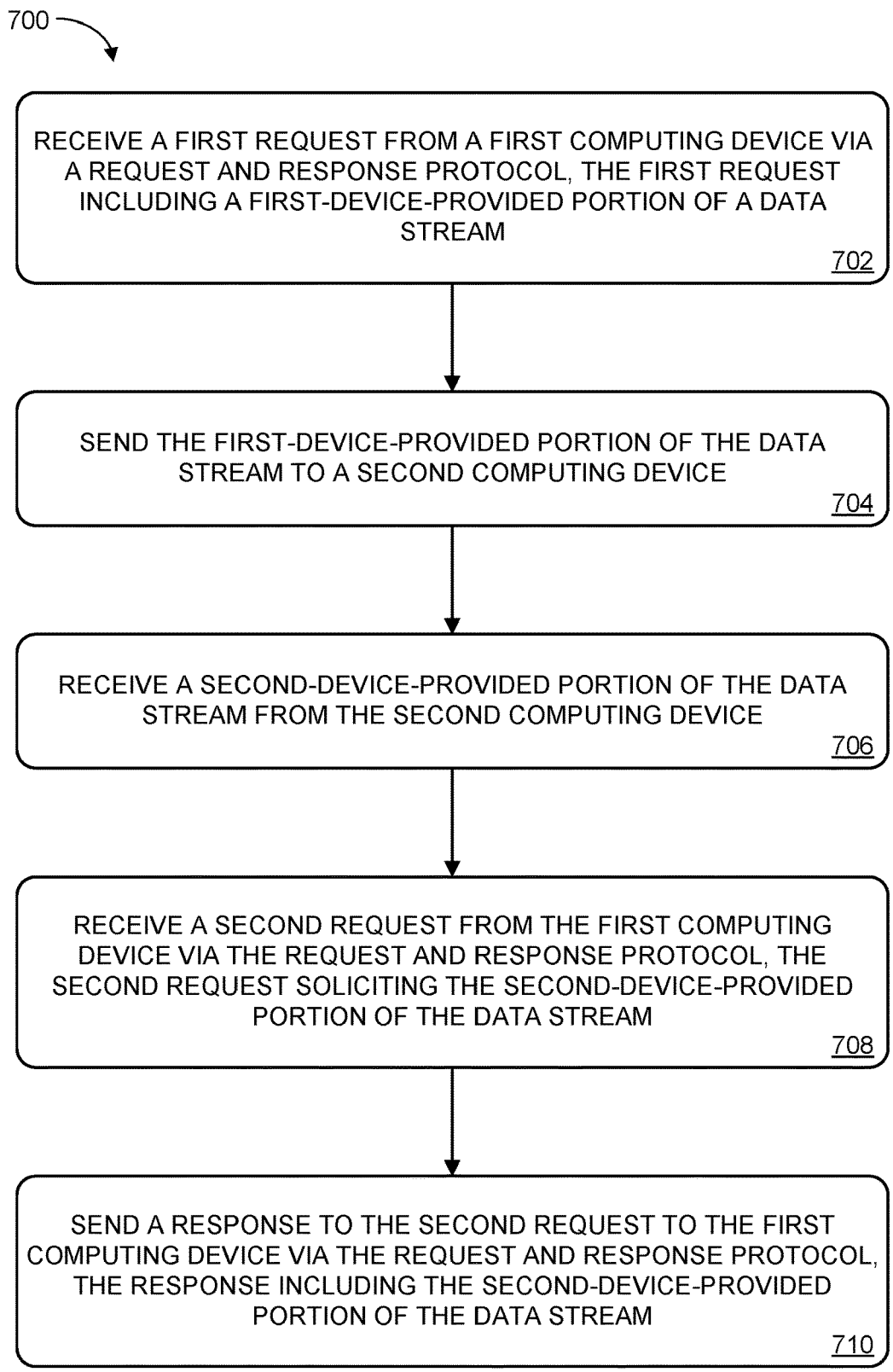
FIG. 7 illustrates another example method for bidirectional data exchange.

Though method 500 and the above description of FIG. 6 focuses primarily on actions performed by the computing device, it will be understood that, according to the present disclosure, one or more actions associated with bidirectional data exchange may additionally or alternatively be performed on what is referred to as the "remote computing device," which may take the form of an intermediate server, and/or other network computing device that is remote from one or both of the first and second computing devices. Accordingly, FIG. 7 shows another example method 700 for bidirectional data exchange. Specifically, method 500 can be implemented on a network computing device, which may be the same as the remote computing device described above with respect to FIG. 5, (e.g., a TURN server, and/or other suitable server or remote computing device) exchanging a bidirectional data stream with two or more computing devices. In some cases, method 700 may be implemented on a computing system as described below with respect to FIG. 8. Further, method 500 may be implemented on any suitable network environment, using any suitable request and response protocol. In other words, method 500 need not be restricted to network environments that use NAT, DPI, HTTP, etc.

At 702, method 700 includes receiving a first request from a first computing device via a request and response protocol, the first request including a first-device-provided portion of a data stream. This is shown in FIG. 6, in which remote computing device 602 receives first request 606 from first computing device 600. In FIG. 6, portions of the data stream are labeled from the perspective of the first computing device (i.e., outgoing portion 608 and incoming portion 612). From the perspective of the network computing device, the outgoing portion of the data stream is the first-device-provided portion of the data stream.

At 704, method 700 includes sending the first-device-provided portion of the data stream to the second computing device. This is shown in FIG. 6 as, after receiving the first-device-provided portion of the data stream (i.e., outgoing portion 608) from the first computing device, the network computing device sends the first-device-provided portion to second computing device 604. Notably, sending of the first-device-provided portion of the data stream to the second computing device need not use the same network protocol as receiving of the first-device-provided portion from the first computing device. In other words, depending on the network configuration of the second computing device, the network computing device may exchange data with the second computing device using network protocols better suited to bidirectional data exchange. For example, the network computing device may send the first-device-provided portion of the data stream to the second computing device via UDP, as opposed to TCP. Conversion of request-and-response traffic to traffic that relies on a different network protocol may be done in any suitable way.

Returning to FIG. 7, at 706, method 700 includes receiving a second-device-provided portion of the data stream from the second computing device. This is shown in FIG. 6, in which remote computing device 602 receives the second-device-provided portion of the data stream (i.e., incoming portion 612) from the second computing device. In some cases, sending of the first-device-provided portion of the data stream to the second computing device and receiving of the second-device-provided portion of the data stream from the second computing device may happen concurrently, for example using a suitable network protocol that allows for bidirectional data exchange (e.g., RTP over UDP). However, in other cases, data exchange between the network computing device and the second computing device may be done with multiple request and response streams, depending on the network environment of the second computing device.

Returning to FIG. 7, at 708, method 700 includes receiving a second request from the first computing device via the request and response protocol, the second request soliciting the second-device-provided portion of the data stream. This is shown in FIG. 6, in which remote computing device 602 receives second request 610 from first computing device 600, the second request soliciting the second-device-provided portion of the data stream (i.e., incoming portion 612).

Returning to FIG. 7, at 710, method 700 includes sending a response to the second request to the first computing device via the request and response protocol, the response including the second-device-provided portion of the data stream. This is shown in FIG. 6, as remote computing device 602 sends response 614 to first computing device 600, the response including the second-device-provided portion of the data stream (i.e., incoming portion 612).

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
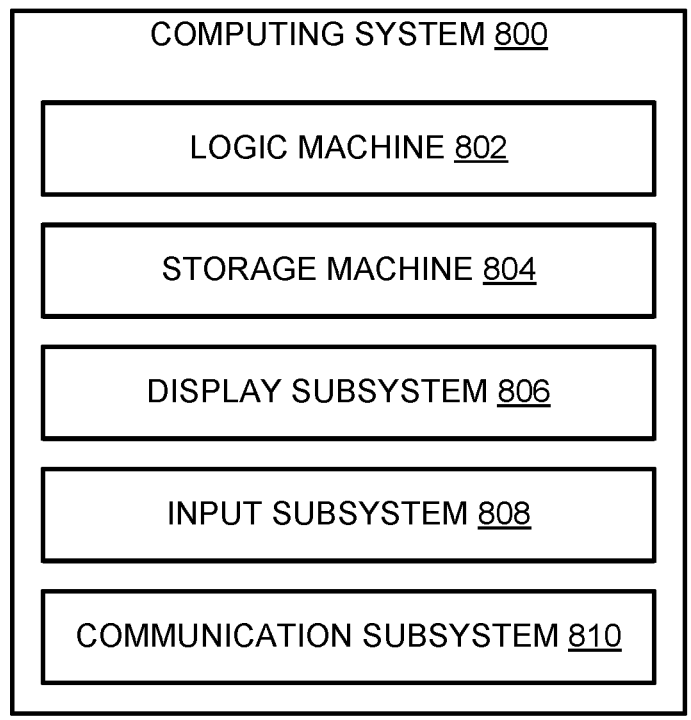
FIG. 8 schematically illustrates an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In an example, a method for bidirectional data exchange comprises: on a network computing device, receiving a first request from a first computing device via a request and response protocol, the first request including a first-device-provided portion of a data stream; sending the first-device-provided portion of the data stream to a second computing device; receiving a second-device-provided portion of the data stream from the second computing device; receiving a second request from the first computing device via the request and response protocol, the second request soliciting the second-device-provided portion of the data stream; and sending a response to the second request to the first computing device via the request and response protocol, the response including the second-device-provided portion of the data stream. In this example or any other example, the request and response protocol is the Hypertext Transfer Protocol (HTTP). In this example or any other example, sending of the first-device-provided portion of the data stream to the second computing device and receiving of the second-device-provided portion of the data stream from the second computing device happens concurrently. In this example or any other example, sending of the first-device-provided portion of the data stream to the second computing device and receiving of the second-device-provided portion of the data stream from the second computing device takes place via the User Datagram Protocol (UDP). In this example or any other example, an intermediate network device between the network computing device and the first computing device is configured to perform Deep Packet Inspection (DPI). In this example or any other example, an intermediate network device between the network computing device and the first computing device is configured to perform Network Address Translation (NAT). In this example or any other example, the network computing device is a Traversal Using Relays around NAT (TURN) server. In this example or any other example, the data stream is a Voice over IP (VoIP) communication between the first computing device and the second computing device including digitized audio from at least one call participant.

In an example, a network computing device comprises: a communications subsystem; a logic machine; and a storage machine holding instructions executable by the logic machine to: via the communications subsystem, receive a first request from a first computing device via a request and response protocol, the first request including a first-device-provided portion of a data stream; send the first-device-provided portion of the data stream to a second computing device; receive a second-device-provided portion of the data stream from the second computing device; receive a second request from the first computing device via the request and response protocol, the second request soliciting the second-device-provided portion of the data stream; and send a response to the second request to the first computing device via the request and response protocol, the response including the second-device-provided portion of the data stream. In this example or any other example, the request and response protocol is the Hypertext Transfer Protocol (HTTP). In this example or any other example, sending of the first-device-provided portion of the data stream to the second computing device and receiving of the second-device-provided portion of the data stream from the second computing device happens concurrently. In this example or any other example, an intermediate network device between the network computing device and the first computing device is configured to perform Deep Packet Inspection (DPI). In this example or any other example, an intermediate network device between the network computing device and the first computing device is configured to perform Network Address Translation (NAT). In this example or any other example, the network computing device is a Traversal Using Relays around NAT (TURN) server.

In an example, a network computing device for bidirectional data exchange comprises: means for receiving a first request from a first computing device via a request and response protocol, the first request including a first-device-provided portion of a data stream; means for sending the first-device-provided portion of the data stream to a second computing device; means for receiving a second-device-provided portion of the data stream from the second computing device; means for receiving a second request from the first computing device via the request and response protocol, the second request soliciting the second-device-provided portion of the data stream; and means for sending a response to the second request to the first computing device via the request and response protocol, the response including the second-device-provided portion of the data stream. In this example or any other example, the request and response protocol is the Hypertext Transfer Protocol (HTTP). In this example or any other example, sending of the first-device-provided portion of the data stream to the second computing device and receiving of the second-device-provided portion of the data stream from the second computing device happens concurrently. In this example or any other example, an intermediate network device between the network computing device and the first computing device is configured to perform Deep Packet Inspection (DPI). In this example or any other example, an intermediate network device between the network computing device and the first computing device is configured to perform Network Address Translation (NAT). In this example or any other example, the network computing device is a Traversal Using Relays around NAT (TURN) server.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for bidirectional data exchange, comprising:
   at a network computing device, receiving, via a first inbound Hypertext Transfer Protocol (HTTP) transmission, a first HTTP request from a first computing device, the first HTTP request including a first-device-provided portion of a data stream that includes one or both of digitized audio and digitized video;
   sending, from the network computing device, the first-device-provided portion of the data stream to a second computing device;
   receiving, at the network computing device, a second-device-provided portion of the data stream from the second computing device;
   receiving, at the network computing device via a second inbound HTTP transmission, a second HTTP request from the first computing device, the second HTTP request soliciting the second-device-provided portion of the data stream received by the network computing device from the second computing device; and
   sending, from the network computing device to the first computing device, a first outbound HTTP transmission to the first computing device as a HTTP response to the second HTTP request, the HTTP response including the second-device-provided portion of the data stream.

2. The method of claim 1, where the data stream is not modified to use a non-HTTP protocol between the first computing device and the network computing device.

3. The method of claim 1, where sending of the first-device-provided portion of the data stream to the second computing device and receiving of the second-device-provided portion of the data stream from the second computing device happens concurrently.

4. The method of claim 3, where sending of the first-device-provided portion of the data stream to the second computing device and receiving of the second-device-provided portion of the data stream from the second computing device takes place via a User Datagram Protocol (UDP).

5. The method of claim 1, where an intermediate network device between the network computing device and the first computing device is configured to perform Deep Packet Inspection (DPI).

6. The method of claim 1, where an intermediate network device between the network computing device and the first computing device is configured to perform Network Address Translation (NAT).

7. The method of claim 6, where the network computing device is a Traversal Using Relays around NAT (TURN) server.

8. The method of claim 1, where the data stream is a Voice over IP (VoIP) communication between the first computing device and the second computing device.

9. A network computing device, comprising:
 a communications subsystem;
 a logic machine; and
 a storage machine holding instructions executable by the logic machine to:
  at the network computing device, via the communications subsystem, receive a first inbound Hypertext Transfer Protocol (HTTP) transmission including a first HTTP request from a first computing device, the first HTP request including a first-device-provided portion of a data stream that includes one or both of digitized audio and digitized video;
  at the network computing device, send the first-device-provided portion of the data stream to a second computing device;
  at the network computing device, receive a second-device-provided portion of the data stream from the second computing device;
  at the network computing device, receive, via a second inbound HTTP transmission, a second HTTP request from the first computing device, the second HTTP request soliciting the second-device-provided portion of the data stream received by the network computing device from the second computing device; and
  at the network computing device, send, to the first computing device, a first outbound HTTP transmission to the first computing device as a HTTP response to the second HTTP request, the HTTP response including the second-device-provided portion of the data stream.

10. The network computing device of claim 9, where the data stream is not modified to use a non-HTTP protocol between the first computing device and the network computing device.

11. The network computing device of claim 9, where sending of the first-device-provided portion of the data stream to the second computing device and receiving of the second-device-provided portion of the data stream from the second computing device happens concurrently.

12. The network computing device of claim 9, where an intermediate network device between the network computing device and the first computing device is configured to perform Deep Packet Inspection (DPI).

13. The network computing device of claim 9, where an intermediate network device between the network computing device and the first computing device is configured to perform Network Address Translation (NAT).

14. The network computing device of claim 13, where the network computing device is a Traversal Using Relays around NAT (TURN) server.

15. A network computing device for bidirectional data exchange, comprising:
 means for receiving, at the network computing device via a first inbound Hypertext Transfer Protocol (HTTP) transmission, a first HTTP request from a first computing device, the first HTTP request including a first-device-provided portion of a data stream that includes one or both of digitized audio and digitized video;
 means for sending, at the network computing device, the first-device-provided portion of the data stream to a second computing device;
 means for receiving, at the network computing device, a second-device-provided portion of the data stream from the second computing device;
 means for receiving, at the network computing device via a second inbound HTTP transmission, a second HTTP request from the first computing device, the second HTTP request soliciting the second-device-provided portion of the data stream received by the network computing device from the second computing device; and
 means for sending, at the network computing device to the first computing device, a first outbound HTTP transmission to the first computing device as a HTTP response to the second HTTP request, the HTTP response including the second-device-provided portion of the data stream.

16. The network computing device of claim 15, where the data stream is not modified to use a non-HTTP protocol between the first computing device and the network computing device.

17. The network computing device of claim 15, where sending of the first-device-provided portion of the data stream to the second computing device and receiving of the second-device-provided portion of the data stream from the second computing device happens concurrently.

18. The network computing device of claim 15, where an intermediate network device between the network computing device and the first computing device is configured to perform Deep Packet Inspection (DPI).

19. The network computing device of claim 15, where an intermediate network device between the network computing device and the first computing device is configured to perform Network Address Translation (NAT).

20. The network computing device of claim 19, where the network computing device is a Traversal Using Relays around NAT (TURN) server.

* * * * *